(12) United States Patent
Alterary et al.

(10) Patent No.: US 12,204,279 B1
(45) Date of Patent: Jan. 21, 2025

(54) TONER AND METHOD OF FORMATION USING FLY ASH-RICH CARBON (71) Applicant: KING SAUD UNIVERSITY, Riyadh (SA)

(72) Inventors: Seham Soliman Alterary, Riyadh (SA); Athar Mohamed Elhadi, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/436,895

(22) Filed: Feb. 8, 2024

(51) Int. Cl.
G03G 9/09 (2006.01)
C09C 1/50 (2006.01)
(Continued)

(52) U.S. Cl.
CPC ............. G03G 9/0904 (2013.01); C09C 1/50 (2013.01); C09C 3/041 (2013.01); G03G 9/0804 (2013.01);
(Continued)

(58) Field of Classification Search
CPC .. G03G 9/0904; G03G 9/0804; G03G 9/0815; G03G 9/0817; G03G 9/08711; G03G 9/08782; C09C 1/50; C09C 3/041
See application file for complete search history.

(56) References Cited

U.S. PATENT DOCUMENTS 4,592,988 A 6/1986 Aldrich et al.
5,120,632 A * 6/1992 Bertrand ................. G03G 9/09
430/110.2

(Continued)

FOREIGN PATENT DOCUMENTS

CN 101220103 A * 7/2008
CN 107352950 A 11/2017
JP H06138691 A * 5/1994

OTHER PUBLICATIONS

English machine translation of the description of CN-101220103-A (Year: 2008).*

(Continued)

Primary Examiner — Peter L Vajda
Assistant Examiner — Boone Alexander Evans
(74) Attorney, Agent, or Firm — Nath, Goldberg & Meyer; Joshua B. Goldberg (57) ABSTRACT A toner based on fly-ash rich carbon and method of producing are disclosed. The process includes preparing a latex and preparing a pigment including fly ash, where the fly ash has been ground to nanoparticle size. The latex, pigment including fly ash, and polyethylene wax are combined in an emulsion aggregation process. The latex is formed by a mixing process including combining ammonium bicarbonate, sodium dodecylbenzene sulfonate, styrene, acrylic acid, and methyl methacrylate. The emulsion aggregation process includes steps of dispersing a mixture of the polyethylene wax, pigment including fly ash, and latex in water, adding zinc oxide, nitric acid, adding Ethylenediaminetetraacetic acid (EDTA), elevating the temperature, neutralizing the product mixture with NaOH solution and cooling the mixture, Centrifuging, washing and drying are performed to achieve a finished toner which includes fly ash pigment, polyethylene wax, poly(styrene-methyl methacrylate-acrylic acid) latex, zinc oxide and a chelating agent.

13 Claims, 6 Drawing Sheets (51) Int. Cl.
*C09C 3/04* (2006.01)
*G03G 9/08* (2006.01)
*G03G 9/087* (2006.01)

(52) U.S. Cl.
CPC ......... *G03G 9/0815* (2013.01); *G03G 9/0817* (2013.01); *G03G 9/08711* (2013.01); *G03G 9/08782* (2013.01)

(56) References Cited

U.S. PATENT DOCUMENTS

| | | |
|---|---|---|
| 6,627,373 B1 | 9/2003 | Patel et al. |
| 6,656,657 B2 | 12/2003 | Patel et al. |
| 6,656,658 B2 | 12/2003 | Patel et al. |
| 9,864,291 B1 * | 1/2018 | Veregin .............. G03G 9/09364 |
| 2019/0196348 A1 * | 6/2019 | Murakami ........... G03G 9/0902 |

OTHER PUBLICATIONS

English machine translation of the description of JP-H06138691-A (Year: 1994).*

Marczyk, Joanna, et al. "Hybrid Materials Based on Fly Ash, Metakaolin, and Cement for 3D Printing." Materials 14.22 (2021): 6874.

Lu, Xuhang, et al. "Recycling of Coal Fly Ash in Building Materials: A Review." Minerals 13.1 (2022): 25.

Pan, Jill R., et al. "Recycling MSWI bottom and fly ash as raw materials for Portland cement." Waste Management 28.7 (2008): 1113-1118.

* cited by examiner

TONER AND METHOD OF FORMATION USING FLY ASH-RICH CARBON

BACKGROUND

Field

The disclosure of the present patent application relates to printer toner, and particularly to a toner and method of making the toner using fly ash-rich carbon.

Description of Related Art

Fly ash is a major waste product from coal-fired power plants. It is estimated that around 700 million tons of fly ash are produced worldwide every year. This poses a major challenge to the environment as fly ash can contaminate soil and water if not disposed of properly. Finding ways to reuse fly ash is therefore an important environmental goal.

Furthermore, there is a significant rise in calls for environmentally friendly products. It is widely recognized that consumers are becoming increasingly conscious of the environmental consequences associated with their purchases and are actively seeking ways to minimize their own ecological impact. This shift in consumer preferences presents a demand for alternative ink toners produced by more sustainable methods than traditional ink toner. Thus, a need exists for new, sustainable methods of toner production which benefit the environment.

SUMMARY OF THE INVENTION

A toner and method of producing the toner are disclosed herein. The toner is produced by preparing a latex followed by preparation of a pigment including fly ash, wherein the fly ash has been ground to nanoparticle size. The latex, the fly ash pigment, and polyethylene wax are combined in an emulsion aggregation process. The emulsion aggregation process includes steps of: dispersing a mixture of the polyethylene wax, pigment including fly ash, and latex in deionized water using a mechanical stirrer to achieve a homogeneous suspension; adding zinc oxide, nitric acid, and deionized water in sequence to the homogeneous suspension until the pH reaches about 2; continuously stirring the mixture of and adding Ethylenediaminetetraacetic acid (EDTA); increasing the temperature of the mixture to an elevated temperature and maintaining the mixture at an elevated temperature for about an hour; neutralizing the product mixture with NaOH solution and cooling the mixture; and centrifuging, washing with deionized water and drying to achieve a finished toner.

In an embodiment, the emulsion aggregation process includes mixing about 3 g of polyethylene wax, about 2 g of pigment comprising fly ash, about 24.5 g of poly(styrene-methyl methacrylate-acrylic acid) latex, and about 120 mL of deionized water. In addition, the mechanical stirrer may be operated at about 340 rpm for about 15 minutes followed by a rotational speed of about 1000 rpm for about 5 minutes, followed by a rotational speed of about 450 rpm for about 1 hour.

In an embodiment, the emulsion aggregation process may include adding about 0.6 g zinc oxide, about 3 mL of nitric acid, and about 9 mL of deionized water. The process may include maintaining a mixture at a temperature of about 50° C. for about 30 minutes followed by adding about 1.475 g of Ethylenediaminetetraacetic acid (EDTA).

In an embodiment, the latex is poly(styrene-methyl methacrylate-acrylic acid) and is prepared by steps of: combining ammonium bicarbonate ($NH_4HCO_3$) and sodium dodecylbenzene sulfonate (SDBS) in water to form a solution; using a dropping funnel to add styrene (St), acrylic acid, and methyl methacrylate to the solution; heating the solution to about 70° C. and stirring for about 0.5 hours; adding an aqueous solution of ammonium persulfate to the solution; and heating the solution at about 80° C. for about 10 h.

In an embodiment, the fly ash pigment is prepared by grinding fly ash in a ball mill at a speed of about 400 rpm for about 20 h.

In an embodiment, the toner produced by the present method includes fly ash pigment, polyethylene wax, poly (styrene-methyl methacrylate-acrylic acid) latex, zinc oxide, and a chelating agent.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Figure 1:
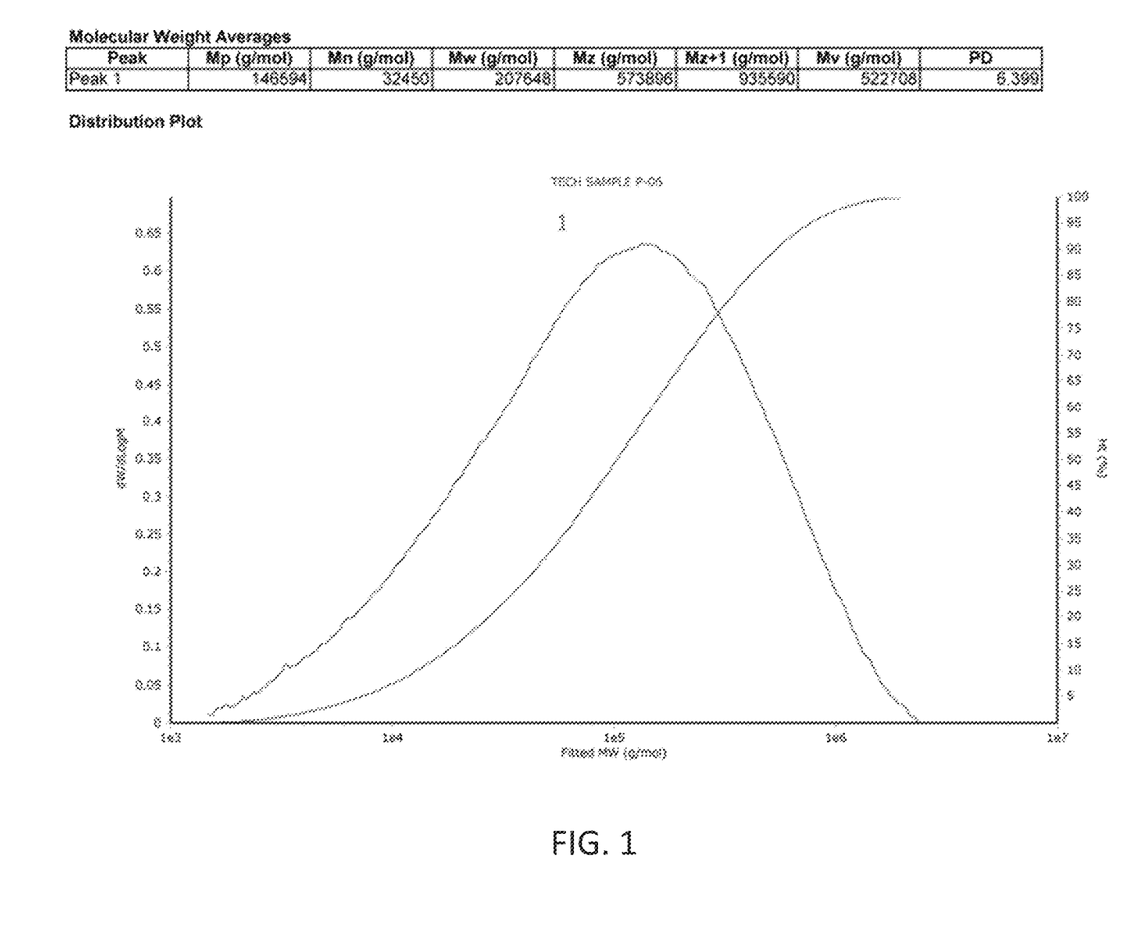
FIG. 1 is a GPC analysis of synthetic (P(St-MMA-AA)) revealing the average molecular weight for an approximately 6 h reaction time.
Figure 2:
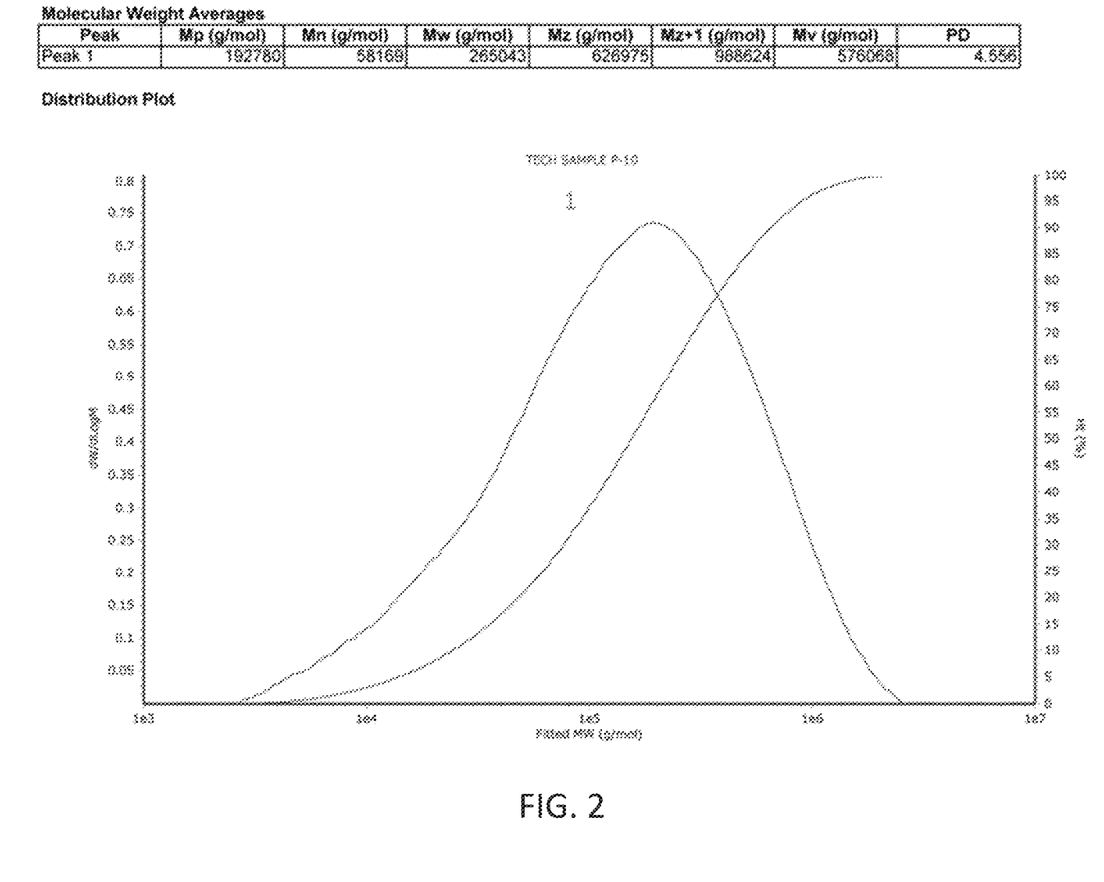
FIG. 2 is a GPC analysis of synthetic (P(St-MMA-AA)) revealing the average molecular weight for an approximately 10 h reaction time.

A toner and method of producing toner are disclosed herein. The toner is produced by preparing a latex such as poly(styrene-methyl methacrylate-acrylic acid) [P(St-MMA-AA)] followed by preparing a pigment including fly ash. The preparation of the polymer latex uses a traditional approach to form (P(St-MMA-AA)). The reaction firstly includes a combination of ammonium bicarbonate ($NH_4HCO_3$) and sodium dodecylbenzene sulfonate (SDBS) in water. Next, using a drop funnel, styrene (St), acrylic acid (AA) and methyl methacrylate (MMA) are added to the solution while also heating to a temperature of about 70° C. and stirring for about 0.5 hours. Next, an aqueous solution of ammonium persulfate (APS) was added dropwise with stirring and heating to a temperature of about 80° C. for about 10 h. The reaction was stopped at about 6 h to conduct a gel-permeation chromatography (GPC) analysis. The GPC analysis of synthetic (P(St-MMA-AA)) reveals the average molecular weight for an approximately 6 h reaction time as shown in FIG. 1, with weight-average molecular weight (Mw)=207648, number-average molecular weight (Mn)=32450, and polydispersity index (PD)=6.3. The reaction time at approximately 10 h is shown in FIG. 2 where Mw=265043, Mn=58169 and PD=4.5.

Figure 3:
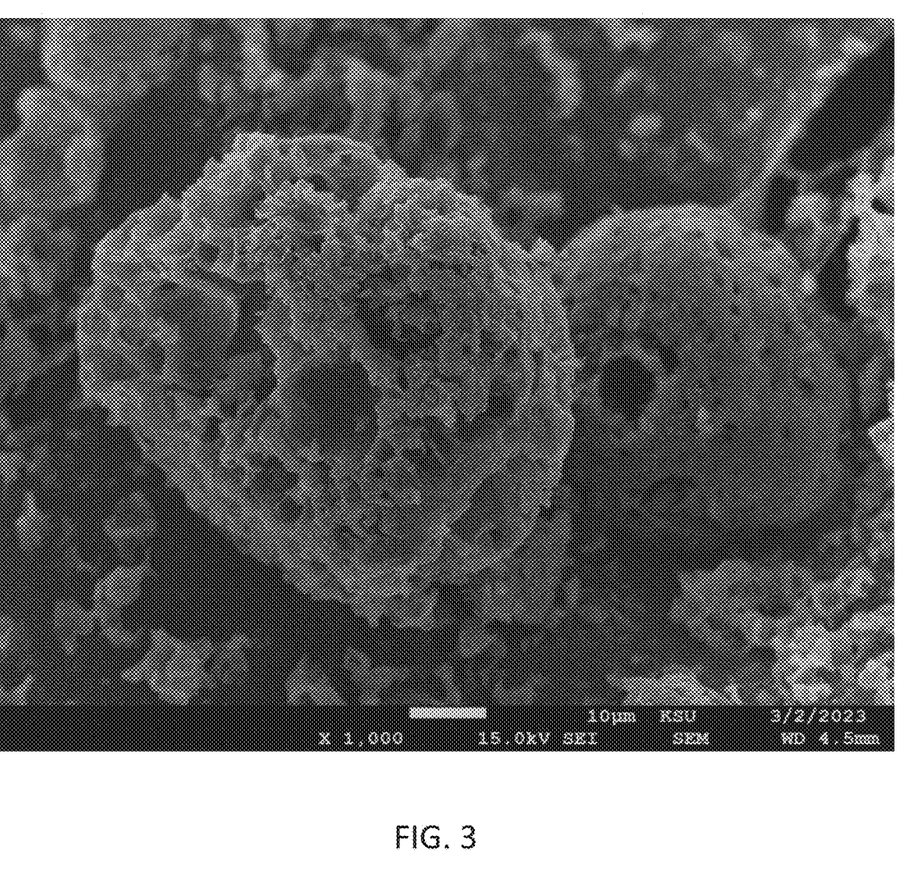
FIG. 3 is an SEM image of fly ash prior to a grinding process.
Figure 4:
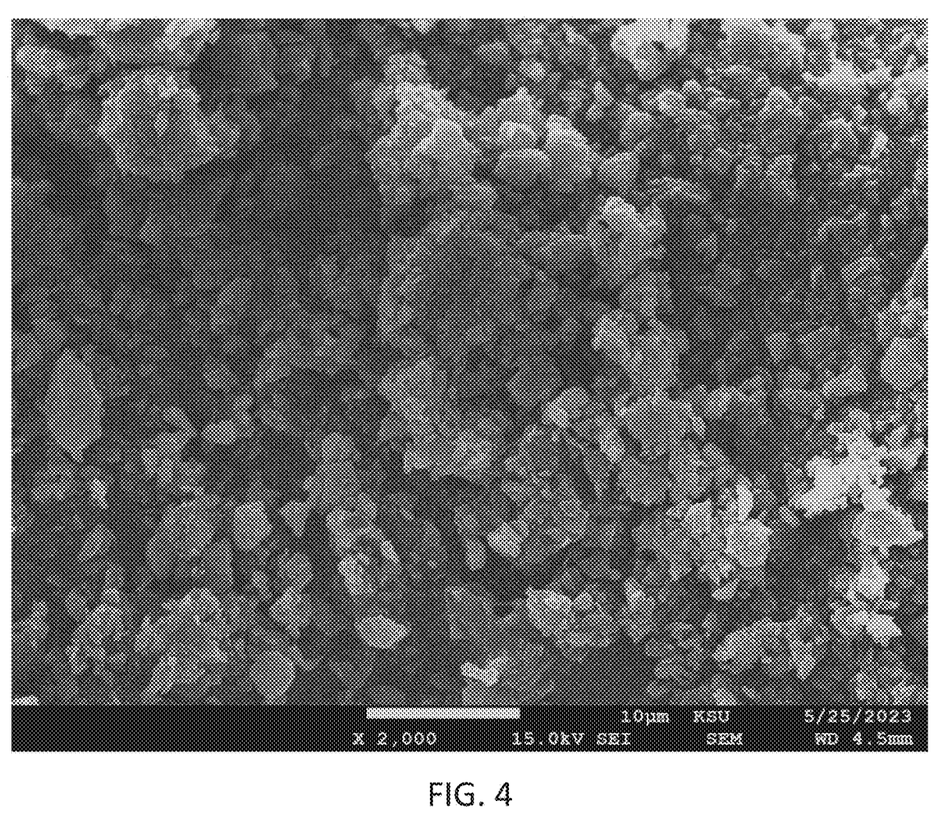
FIG. 4 is an SEM image of fly ash resulting from a grinding process.
Figure 5:
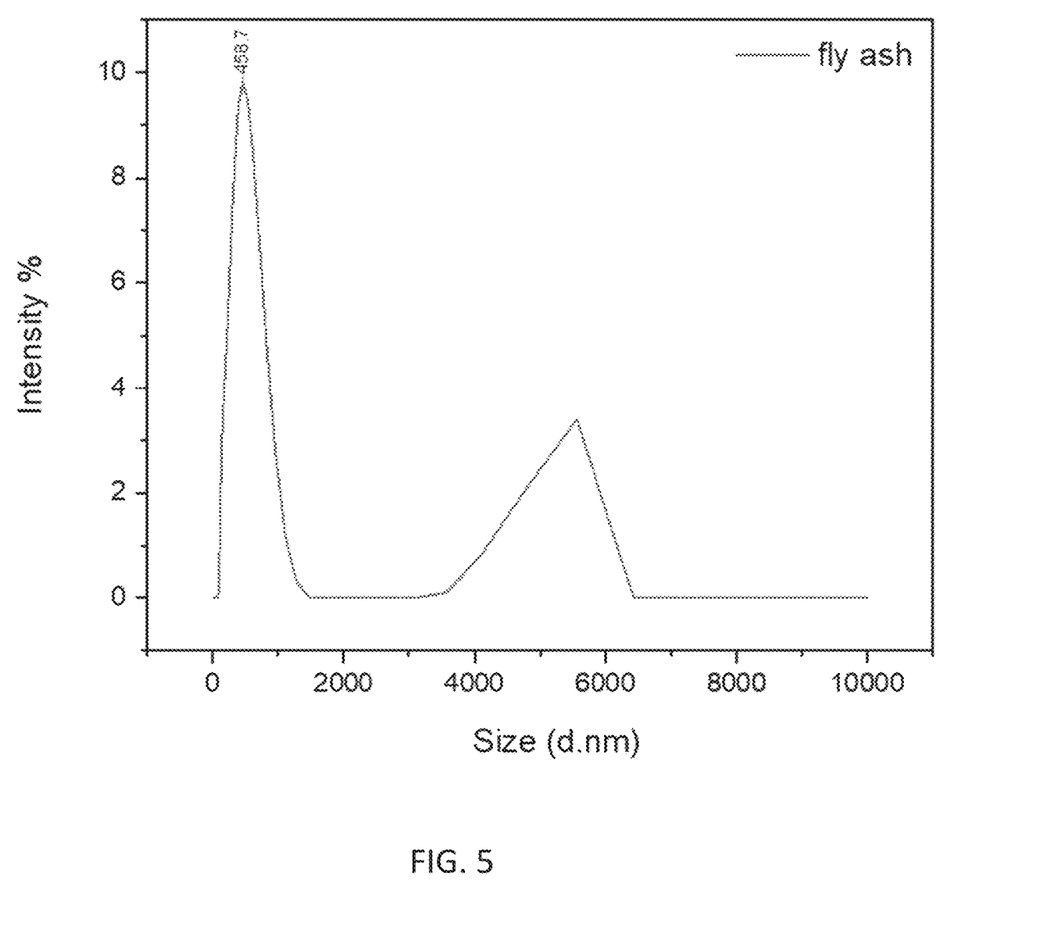
FIG. 5 is a graph of the molecular weight distribution for the fly ash after a grinding process.

For the pigment, fly ash-rich carbon was chosen. The fly ash-rich carbon was milled using a Fritsch planetary micro mill Pulverisette 7 using seven balls with diameter of 10 mm at a speed of about 400 rpm for about 20 hours. As a result, the size of the fly ash was reduced to nanometer size for use as a toner pigment. FIG. 3 and FIG. 4 are scanning electron microscope (SEM) images of the fly ash before and after grinding, respectively. FIG. 5 is a graph of the molecular weight distribution after grinding.

Figure 6:
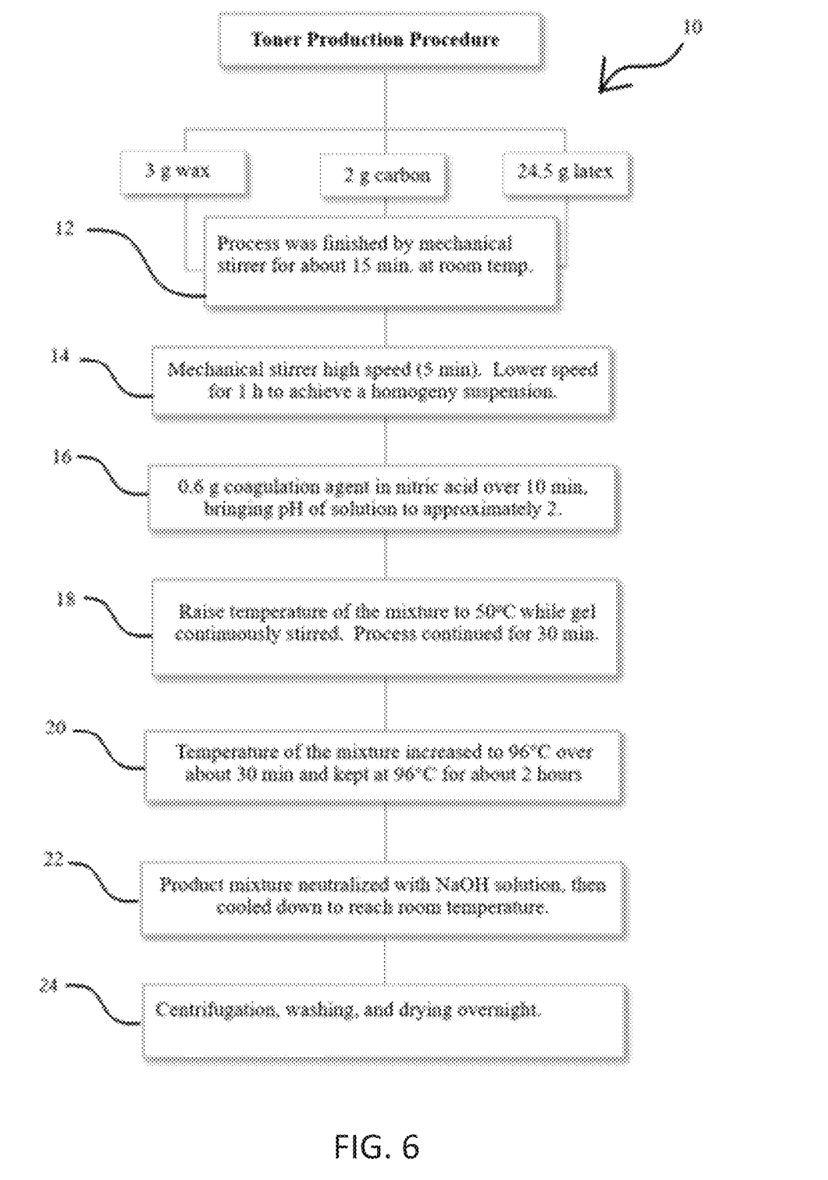
FIG. 6 is a flowchart of an emulsion aggregation process for producing toner.

Turning to FIG. 6, a non-limiting embodiment of a flowchart 10 illustrating the emulsion aggregation process used in the method of producing toner is shown. In block 12, about 3 g of polyethylene wax, about 2 g of the fly ash after milling and about 24.5 g of the [P(St-MMA-AA)] latex are mixed in about 120 mL of deionized water by mechanical stirrer at about 340 rpm for about 15 min at room temperature (between about 20° C. to about 25° C.). Next, in block 14, a mechanical mixer was used for about 5 minutes at about 1000 rpm. The mixture was then stirred at about 450 rpm for about 1 hour to achieve a homogeny suspension.

In block 16 of FIG. 6, about 0.6 g of zinc oxide, about 3 mL of nitric acid, and about 9 mL of deionized water was mixed dropwise into the solution for about 10 minutes, bringing the pH value of the solution to about 2. Here, the zinc oxide serves as a coagulation/thickening agent, with the product in this step changing the viscosity to a gel. Next, in block 18, the temperature of the mixture is brought to about 50° C. while the gel is continually stirred manually or automatically. The process is continued for about 30 minutes after which about 1.475 g of Ethylenediaminetetraacetic acid (EDTA) as a chelating agent is added to stop further aggregation. Next, in block 20, the temperature of the mixture is increased to about 96° C. over a period of about 30 min and was kept at this temperature for about 2 hours. In block 22, the product mixture was neutralized with about 0.1 M sodium hydroxide (NaOH) solution and then cooled down to reach room temperature (between about 20° C. to 25° C.). The final toner product was achieved after centrifugation at about 10,000 rpm for about 10 min, and washing with deionized water was performed, followed by drying in an oven for about 40° C. overnight. Upon completion, the final toner composition was as follows:

| Toner particles | Percent by weight |
| --- | --- |
| Pigment (fly ash) | 6.33% |
| Wax (polyethylene) | 9.5% |
| Latex (P(St-MMA-AA)) | 77.6% |
| Coagulant agent (zinc oxide) | 1.9% |
| Chelating agent (EDTA) | 4.67% |

| Toner particles | Percent by weight |
| --- | --- |

It is to be understood that the toner and method of formation thereof is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of producing toner, comprising:
   preparing a latex;
   preparing a pigment comprising fly ash having a nanoparticle size; and
   combining the latex, the pigment comprising the fly ash, and polyethylene wax in an emulsion aggregation process to form the toner;
   wherein the emulsion aggregation process comprises steps of:
   a) dispersing a mixture of the polyethylene wax, the pigment comprising the fly ash, and the latex in deionized water using a mechanical stirrer to achieve a homogeneous suspension;
   b) adding zinc oxide, nitric acid, and deionized water in sequence to the homogeneous suspension until the pH reaches about 2;
   c) continuously stirring the mixture of step b) and adding Ethylenediaminetetraacetic acid (EDTA);
   d) increasing the temperature of the mixture in step c) to an elevated temperature and maintaining the mixture at the elevated temperature for about an hour to form a product mixture;
   e) neutralizing the product mixture with NaOH solution and cooling the product mixture, and
   f) centrifuging, washing with deionized water and drying the product mixture to form the toner.

2. The method of producing toner as recited in claim 1 wherein step a) further comprises adding about 3 g polyethylene wax, about 2 g of pigment comprising fly ash, about 24.5 g of poly(styrene-methyl methacrylate-acrylic acid) latex, and about 120 mL of deionized water.

3. The method of producing toner as recited in claim 1 wherein step a) further comprises adding about 3 g polyethylene wax, about 2 g of pigment comprising fly ash, about 24.5 g of poly(styrene-methyl methacrylate-acrylic acid) latex, and about 120 mL of deionized water.

4. The method of producing toner as recited in claim 2, wherein step b) comprises adding about 0.6 g zinc oxide, about 3 mL of nitric acid, and about 9 mL of deionized water.

5. The method of producing toner as recited in claim 4, wherein step c) comprises maintaining the mixture of step b) at a temperature of about 50° C. for about 30 minutes and adding about 1.475 g of Ethylenediaminetetraacetic acid (EDTA).

6. The method of producing toner as recited in claim 1, wherein the latex is poly(styrene-methyl methacrylate-acrylic acid) and is prepared by steps of:
   i) combining ammonium bicarbonate ($NH_4HCO_3$) and sodium dodecylbenzene sulfonate (SDBS) in water to form a solution;
   ii) using a dropping funnel to add styrene (St), acrylic acid, and methyl methacrylate to the solution of step i);
   iii) heating the solution of step ii) to about 70° C. and stirring for about 0.5 hours;
   iv) adding an aqueous solution of ammonium persulfate to the solution of step iii); and
   v) heating the solution of step iv) at about 80° C. for about 10 h.

7. The method of producing toner as recited in claim 1, wherein preparing the pigment comprises grinding fly ash in a ball mill at a speed of about 400 rpm for about 20 h.

8. A toner formed by the method of claim 1.

9. The toner of claim 8 comprising:
   fly ash pigment;
   polyethylene wax;
   poly(styrene-methyl methacrylate-acrylic acid) latex;
   zinc oxide; and
   a chelating agent.

10. The method of producing toner as recited in claim 5, wherein the latex is poly(styrene-methyl methacrylate-acrylic acid) and is prepared by steps of:
    i) combining ammonium bicarbonate ($NH_4HCO_3$) and sodium dodecylbenzene sulfonate (SDBS) in water to form a solution;
    ii) using a dropping funnel to add styrene (St), acrylic acid, and methyl methacrylate to the solution of step i);
    iii) heating the solution of step ii) to about 70° C. and stirring for about 0.5 hours;
    iv) adding an aqueous solution of ammonium persulfate to the solution of step iii); and
    v) heating the solution of step iv at about 80° C. for about 10 h.

11. The method of producing toner as recited in claim 10, wherein preparing the pigment comprises grinding fly ash in a ball mill at a speed of about 400 rpm for about 20 h.

12. A toner formed by the method of claim 5.

13. A toner formed by the method of claim 11.

* * * * *